Patented Dec. 6, 1938

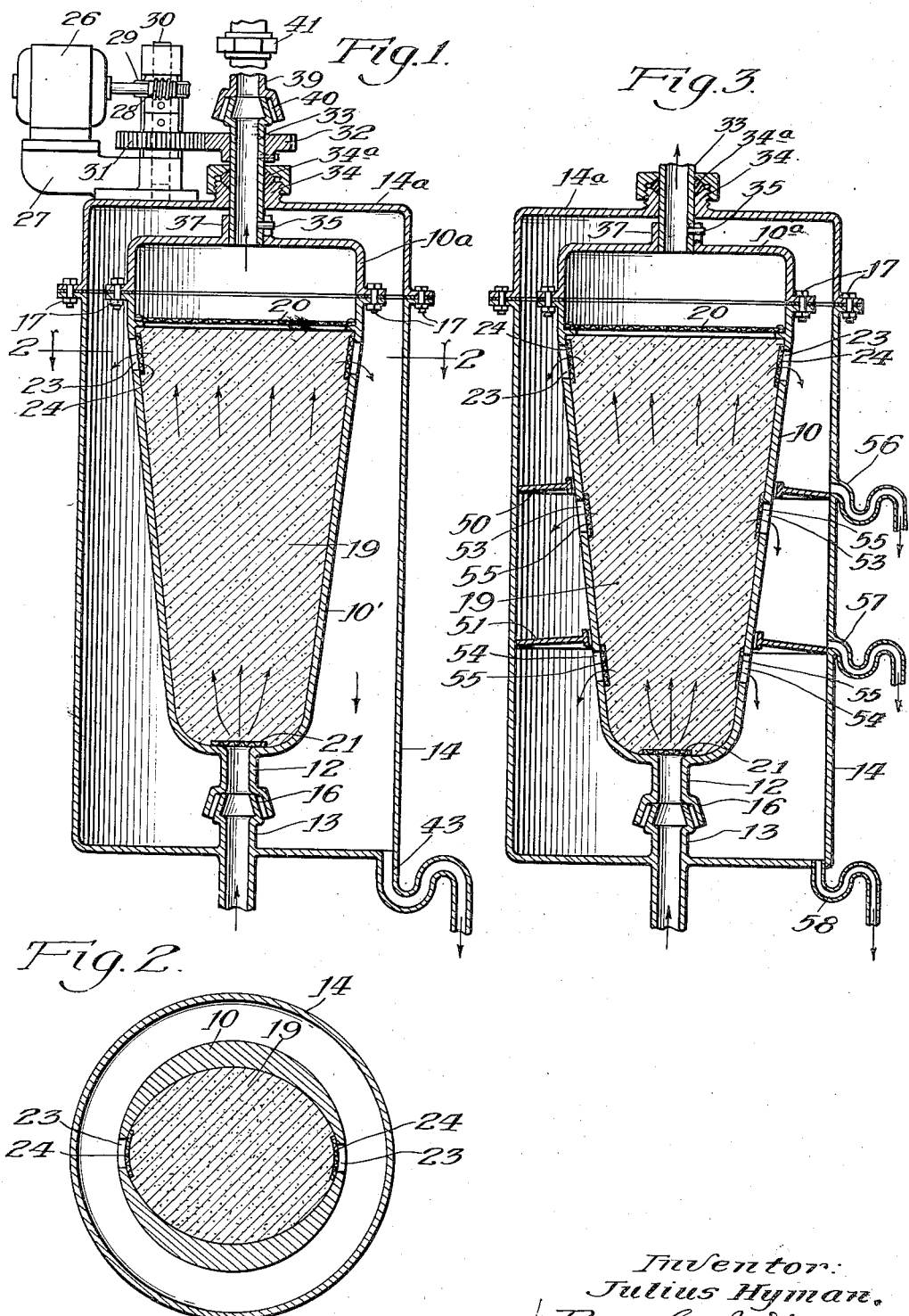

2,138,861

UNITED STATES PATENT OFFICE 2,138,861

METHOD AND APPARATUS FOR TREATING VAPORS OR GASES

Julius Hyman, Chicago, Ill., assignor to Velsicol Corporation, Chicago, Ill., a corporation of Illinois Application May 25, 1936, Serial No. 81,643

7 Claims. (Cl. 23—288)

This invention relates particularly to a method and apparatus for physically or chemically converting or separating vapors and gases to produce a liquid having characteristics different from the vapor or gas being treated, and pertains to the general class of methods and apparatus of the type wherein vapors and gases are caused to pass through a body of suitable contact material for effecting liquefaction of a portion of the vapors or gases, or for causing a reaction thereof, so as to produce a final liquid product having characteristics different from the vapors or gases treated.

As will be manifest, the invention is of broad scope and capable of adaptation to many different arts. Heretofore, when it was desired to treat reactive vapors or gases, such vapors or gases were caused to pass vertically or horizontally through a bed of contact material, the liquid product resulting from the reaction usually being withdrawn at the base of the bed of contact material. The bed of contact material may be of varied thicknesses and in some instances the bed is of considerable thickness, depending upon the nature of the process and the care required in the preparation of the product. Very often, the time element during which the vapors and gases are in contact with the contact material is of considerable importance, and in many instances where the resultant liquid product is permitted to remain unduly long in contact with the contact material the product may become impaired, i. e., some of the desirable characteristics of the liquid may be decreased, or undesirable characteristics increased, so that the final liquid product does not possess the exact characteristics desired. Furthermore, the presence of the liquid product in contact with the contact material sometimes has the effect of "flooding" the contact material and thereby reducing its efficiency.

One of the objects of the present invention is to provide an improved method and apparatus by virtue of which the liquid products of physical or chemical conversion or separation may be efficiently produced and expeditiously removed from the contact material through which the vapors or gases pass.

Another object resides in the provision of novel apparatus for extracting from the contact material, by centrifugal force, the liquid products of physical or chemical conversion or reaction.

A further object is to provide improved apparatus of the character indicated, which includes a rotary chamber constructed and arranged so that the vapors or gases are caused to pass through a body of granular contact material and, due to rotation of the chamber, the liquid products of physical or chemical conversion or reaction are extracted therefrom by centrifugal force.

A still further object of this invention is to provide a novel contact chamber rotatable about a vertical axis constructed and arranged so that the vapors or gases are caused to pass upward or downward through a body of contact material, and the liquid product of physical or chemical conversion or reaction is extracted therefrom by centrifugal force, and caused to travel in an upward or downward direction for discharge through an opening provided in the wall of the chamber. The direction of travel of vapor and product need not be identical.

Still another object is to provide novel apparatus for and method of fractionally separating the liquid products of physical or chemical conversion or reaction by passing the vapors or gases in an upward or downward direction through a body of granular contact material which is carried in a chambered body rotatable about a vertical axis, by virtue of which the liquid products of conversion or reaction are discharged by centrifugal force through a plurality of vertically spaced apart openings in the chambered body.

Other objects and advantages of the method and apparatus herein disclosed will appear from the following description taken in connection with the accompanying drawing in which:

Fig. 1 is a vertical section representing more or less diagrammatically apparatus embodying the present invention;

Fig. 2 is a transverse sectional view taken as indicated at a line 2—2 on Fig. 1;

Fig. 3 is a vertical section similar to Fig. 1 showing a modified construction, adapted for fractionally separating liquids.

For purposes of illustration, I have selected a specific application of the invention to an art wherein hydrocarbon vapors or gases are catalytically treated and the resultant product is a hydrocarbon liquid at the temperature of the catalytic treatment.

Referring now in detail to the drawing, an illustrative apparatus comprising this invention includes a chambered body 10 rotatable about a vertical axis, the interior of said chambered body being of elliptical cross-section, as may be seen in Fig. 2 of the drawing, and gradually increases in cross-sectional area from the lower end thereof toward its upper end. The lower end of said chambered body is provided with a downwardly extending conduit portion 12 which registers with a conduit portion 13 extending into and projecting exteriorly of a receptacle 14 which completely envelops or encloses the rotatable body 10. The chambered body may be supported within the receptacle 14 in any convenient manner, and as herein shown, the respective conduits 12 and 13 are cooperatively formed for accommodating a tapered roller bearing 15, for providing anti-friction support for the chambered body 10 during rotation. Both chambered body 10 and the enveloping receptacle 14 are provided with top members 10a and 14a respectively which are detachably connected to the respective main elements by bolts 17. By virtue of the detachable connection of the heads or tops of the chambered body and enveloping receptacle access may be readily had to the interior of the chambered body to permit cleansing or replacement of the body of contact material, which for purposes of the selected illustration is a granular catalytic agent, indicated at 19.

The body of granular catalytic agent is confined in the chambered body 10 by a screen 20 secured to the inner wall of the chambered body, adjacent the upper end, and the lower end of the body is provided with a screen 21 overlying the opening of the conduit 12 so as to prevent the granular catalyst from passing downwardly into the conduit. The wall of the chambered body is provided with a pair of windows or apertures 23 adjacent the upper end and in registration with the portion of the body containing the catalytic agent, and preferably these apertures are located at the ends of the elliptical cross sectional form of the chambered body. Each of the apertures is protected by a screen 24 for confining the granular catalyst in the chambered body, while permitting discharge therethrough of the liquid products of catalysts.

The chambered body may be rotated in any convenient manner, and as herein shown separate drive mechanism is provided for directly imparting motion to said body. Said drive mechanism includes an electric motor 26 mounted on a pedestal 27 secured to the upper side of the receptacle top 14a. Said motor drives a worm 28 meshing with a worm gear 29 carried on a vertically disposed shaft 30 which is journalled in bearings 27a forming part of the pedestal, 27. Mounted on said shaft is a spur gear 31, with which is meshed a spur gear 32, rigidly secured to a hollow tubular shaft 33, which extends downwardly through a packed bearing 34 carried by the receptacle top 14a. Said tubular shaft may be extended into the receptacle, 14, as seen in Fig. 1 of the drawing, so that the lower end thereof which is provided with a laterally extending pin 35, may detachably engage in an upwardly open seat formed in a bearing flange 37 of the top member 10a of the chambered body. The upper portion of the tubular shaft 33 is adapted to register with a conduit 39, and the adjacent ends of said members are cooperatively formed for receiving a tapered roller bearing 40, for assisting in anti-frictionally guiding the rotary body 10. Interposed in the conduit 39 is a coupling member 41 which is provided for the purpose of permitting quick and easy disconnection, so that upon removal of the bolts 17 the top members 10a and 14a of the chambered body and receptacle respectively may be removed for affording access to the interior of the catalytic chamber.

In operation, the reactive vapors or gases are passed upwardly through the conduits 13 and 12, through the granular catalytic agent 19 contained in the body, 10, while the catalytic chamber or body 10 is being rotated by means such as above described. As the liquid products of catalysis form they are directed laterally by the centrifugal force created by the rotation of the chambered body, and due to the shape of the wall of the interior of the chambered body the liquid impinging against the wall by centrifugal force is caused to travel in an upward direction because of the gradually increasing cross sectional area of the chambered body. To facilitate removing the liquid from the chambered body the elliptical cross section thereof serves an important purpose, and it will be manifest that due to this elliptical form the liquid products of catalysis will collect adjacent the respective ends of the ellipse and tend to travel upwardly in a somewhat confined trough formed thereby for discharge through the screened apertures 23 adjacent the upper end of the chambered body. The liquid thus discharged collects in the receptacle 14 and may be drawn off through the discharge outlet 43 located adjacent the lower end of the receptacle. The unreacted vapors which have passed through the body of the catalytic agent pass upwardly through the tubular shaft 33 and may be accumulated at some suitable storage chamber. Because a certain amount of vapor passes through the screened apertures 23 into the upper portion of the receptacle 14, the bearing 34 preferably is provided with a packing 34a to provide a seal against leakage of the vapors. Manifestly by virtue of this construction the liquid products of catalysis are caused to be expeditiously removed from contact with the catalytic agent, thus prolonging the efficiency of the catalytic agent, and insuring against possible impairment of various characteristics of the resultant liquid product of catalysis, such as may be caused by its contact for too long a period of time with the catalytic agent.

The modification of my invention diagrammatically represented in Fig. 3 makes it possible to achieve a fractionation and separation of the liquid products of physical or chemical conversion or reaction. This construction is substantially the same as that disclosed in Fig. 1, with the exception that the receptacle 14 is provided with a plurality of transversely disposed baffle walls 50 and 51 surrounding the chamber, 10, thus dividing the receptacle 14 into a plurality of separate chambers. These baffle walls 50 and 51 are preferably inclined downwardly toward the outer edge while the inner edge is disposed in relatively close proximity to the outer wall of the chamber. The wall of the catalytic chamber is provided with additional sets of apertures 53, 54 which are also provided with screens 55 and which apertures register with the respective compartments or chambers formed in the receptacle 14. Each of the chambers in the receptacle are provided with separate draw-offs as indicated at 56, 57 and 58, preferably located adjacent the lower portions thereof.

Manifestly as the reactive vapors pass upwardly through the contact material 19, a portion of such vapors will respond to treatment more promptly than others. In other words a certain portion of the vapor must necessarily remain in the contact material for a longer period of time than other portions of the vapor in order that the conversion action takes place. As is well understood, those portions of the vapor which require different periods of time for conversion into liquid may possess different or varying characteristics. Therefore, those vapors which are reacted upon promptly and are converted into liquid will be discharged through the aperture 54 into the lowermost chamber of the receptacle for discharge through the draw-off 58. The vapors requiring a longer period of time for reaction to the contact material will when converted into liquid be discharged through the apertures 53 into the intermediate chamber of the receptacle for discharge through the draw-off 57, and those vapors which require still more time for reaction will be converted into liquid adjacent the upper portion of the body of contact material and be discharged through the apertures 23 into the upper chamber of the receptacle for discharging through the draw-off 56. The unreacted vapors will be discharged through the tubular shaft 33 in the same manner as in the construction disclosed in Fig. 1.

The construction disclosed in Fig. 3 has a particularly important application in the field of gasoline refining. An extensively used method of treatment known in the art as "polymerization" consists generally in passing hydrocarbon vapors or gases vertically through a stationary bed of granular contact catalyst, such as diatomaceous earth, and the liquid produced thereby is removed by the action of gravity. This treatment of hydrocarbon vapors is employed for removing the highly unsaturated, gum-forming portions of the cracked gasoline. In carrying out the "polymerization" process in connection with my invention as represented in Fig. 3 of the drawing, an additional advantage will be obtained over the present methods now employed in that the catalyst agent is maintained more free of liquid products of catalysis than by the present methods, thus improving the efficiency of the catalyst agent, while also improving the color of the liquid polymers formed.

As above mentioned, the structure shown in the drawing is more or less diagrammatic, and it may be understood that suitable means may be provided for guiding and assisting in supporting the chambered body 10.

Although I have herein diagramatically illustrated and described a certain application of the method, and a specific form of apparatus embodying the present invention, manifestly, the method is capable of use in many fields, and the apparatus may be altered or modified without departing from the spirit and scope hereof. For example, satisfactory results may be had by designing the apparatus so that the body 10 is rotated about a horizontal axis. Therefore, I do not wish to be understood as limiting my invention to the specific form and application above indicated, except as so limited in the appended claims.

The present invention is particularly adapted to the treatment of hydrocarbon vapors and gases and, more particularly, cracked hydrocarbon vapors and gases, for the purpose of refining or polymerizing such hydrocarbon vapors or gases.

I claim as my invention:

1. In a device of the character described, in combination, a rotatable chambered body containing a body of granular contact material through which vapors or gases pass, said chambered body having inlet and outlet openings at opposite ends thereof, a receptacle completely enveloping said body and having a fluid discharge outlet, conduits connected to the respective inlet and outlet openings of the chambered body and extending through and exteriorly of said enveloping receptacle, the interior of the chamber of said body containing said contact material being of generally conical form, tapering continuously from one end to the other and means for rotating said chambered body, the wall of said body having an opening, remote from said inlet, adjacent the point of greatest diameter along the axis, through which the liquid product of physical or chemical conversion is discharged into the enveloping receptacle by centrifugal force created by the rotation of said chambered body.

2. In a device of the character described, in combination, a rotatable chambered body containing a body of granular contact material through which vapors or gases pass, said chambered body having inlet and outlet openings at opposite ends thereof, a receptacle completely enveloping said body and having a fluid discharge outlet, conduits connected to the respective inlet and outlet openings of the chambered body and extending through and exteriorly of said enveloping receptacle, the interior of the chamber of said body containing said contact material being of generally conical form, increasing in transverse cross-sectional area from adjacent the inlet end toward the outlet end thereof and being provided with peripheral openings intermediate said ends, and means for rotating said chambered body.

3. In a device of the character described, in combination, a rotatable chambered body of generally conical form containing a body of granular contact material through which vapors or gases pass, said chambered body having inlet and outlet openings at opposite ends thereof, a receptacle completely enveloping said body and having a fluid discharge outlet, conduits connected to the respective inlet and outlet openings of the chambered body and extending through and exteriorly of said enveloping receptacle, the length of the transverse cross-section of the portion of the chamber of said body, containing said contact material, being greater in one direction than in a direction at right angles thereto, and means for rotating said chambered body, the wall of said body having an opening, remote from said inlet, adjacent the point of greatest diameter along the axis through which the liquid product of physical or chemical conversion is discharged into the enveloping receptacle by centrifugal force created by the rotation of said chambered body.

4. In a device of the character described, in combination, a rotatable chambered body containing a body of granular contact material through which vapors or gases pass, said chambered body having inlet and outlet openings at opposite ends thereof, a receptacle completely enveloping said body and having a fluid discharge outlet, conduits connected to the respective inlet and outlet openings of the chambered body and extending through and exteriorly of said enveloping receptacle, the portion of the interior of the chamber of said body containing said contact material being of generally conical form and of substantially elliptical transverse cross section, and means for rotating said chambered body, the wall of said body having an opening, remote from said inlet, at a point on the circumference farthest from the axis of rotation through which the liquid product of physical or chemical conversion is discharged into the enveloping receptacle by centrifugal force created by the rotation of said chambered body.

5. In a device of the character described, in combination, a rotatable chambered body for containing a body of granular contact material through which vapors or gases pass, said chambered body having inlet and outlet openings at opposite ends thereof, a receptacle completely enveloping said body, said receptacle including one or more transverse baffle walls surrounding the chambered body and dividing said receptacle into a plurality of chambers, each of said chambers of the receptacle having a fluid discharge outlet, and means for rotating the chambered body in the receptacle, the wall of said body being provided with openings registering with the respective chambers of the receptacle through which the liquid products of physical or chemical conversion are discharged, by centrifugal force created by rotation of said body, for fractionally separating said liquids.

6. In a device of the character described, in combination, a rotatable hollow body of symmetrical but non-circular rotational internal cross-section and generally hyperbolic axial internal cross-section, said body having a mass of contact material contained therein and having peripheral openings situated at chosen points of greatest centrifugal force and openings at the axial ends thereof, vapor inlet and outlet conduits connected respectively to the opposed axial openings and passing through a substantially vapor-tight dismantleable chamber provided with draw-offs, and means for rotating said rotatable body at speeds sufficient to exert powerful centrifugal forces at the periphery of said body.

7. In a device of the character described, in combination, a rotatable hollow body of generally hyperbolic axial internal cross-section having a contact mass contained therein and having peripheral openings at the point of greatest diameter along the axis and vapor inlet and outlet openings at the opposed axial ends thereof, conduits connected to the axial openings and passing through a substantially vapor-tight dismantleable chamber surrounding said body, said chamber provided with a draw-off and means for rotating said rotatable body at speeds sufficient to exert powerful centrifugal forces at the periphery of said body.

JULIUS HYMAN.